(12) United States Patent
Tang et al.

(10) Patent No.: US 11,251,726 B2
(45) Date of Patent: Feb. 15, 2022

(54) INVERTER SYSTEM FOR AN ELECTRIC VEHICLE

(71) Applicant: KARMA AUTOMOTIVE LLC, Irvine, CA (US)

(72) Inventors: Lixin Tang, Irvine, CA (US); Geng Niu, Irvine, CA (US)

(73) Assignee: KARMA AUTOMOTIVE LLC, Irvine, CA (US)

(*) Notice: Subject to any disclaimer, the term of this patent is extended or adjusted under 35 U.S.C. 154(b) by 1 day.

(21) Appl. No.: 16/831,486

(22) Filed: Mar. 26, 2020

(65) Prior Publication Data

US 2021/0305919 A1 Sep. 30, 2021

(51) Int. Cl.
*H02P 5/505* (2016.01)
*B60L 50/51* (2019.01)
*B60K 1/02* (2006.01)

(52) U.S. Cl.
CPC ............. *H02P 5/505* (2016.02); *B60K 1/02* (2013.01); *B60L 50/51* (2019.02); *B60L 2210/44* (2013.01)

(58) Field of Classification Search
CPC ...... H02P 5/505; B60L 50/51; B60L 2210/44; B60K 1/02
See application file for complete search history.

(56) References Cited

U.S. PATENT DOCUMENTS

| 2013/0320677 | A1* | 12/2013 | Yamada | H02K 11/33 290/45 |
| 2018/0166995 | A1* | 6/2018 | Friedlund | H02M 7/003 |
| 2018/0236882 | A1* | 8/2018 | Wang | B60L 50/15 |

FOREIGN PATENT DOCUMENTS

| CN | 108736795 A | 11/2018 |
| EP | 3 436 299 B1 | 2/2020 |
| JP | 2004-120965 A | 4/2004 |
| JP | 2004-304868 A | 10/2004 |
| JP | 2012-222847 A | 11/2012 |

OTHER PUBLICATIONS

International Search Report and Written Opinion dated Jul. 15, 2021 issued by the International Search Authority in related International PCT Application No. PCT/US2021/024241; filed Mar. 25, 2021.

* cited by examiner

*Primary Examiner* — Zoheb S Imtiaz
(74) *Attorney, Agent, or Firm* — Gordon Rees Scully Mansukhani, LLP (57) ABSTRACT

An inverter assembly for an electric vehicle. The inverter assembly includes three inverters driving at least one wheel of the vehicle. Each inverter has a different phases angle relative to the other inverters in order to minimize current ripple and reduce the capacitor size to allow a smaller package for the inverter assembly.

16 Claims, 8 Drawing Sheets

INVERTER SYSTEM FOR AN ELECTRIC VEHICLE

GENERAL DESCRIPTION

The present disclosure related to a power train of an electric vehicle. In particular, an inverter system configured to minimize voltage/current ripples on the DC bus.

Typically, an electric vehicle includes a main battery to power motor(s) that drive the wheels of the vehicle. A DC or an AC motor may be provided for to drive the wheels. DC power from the main battery must be fed to the motor(s) in order to drive the vehicle. An inverter is used to convert the DC power of the main battery to AC power.

A phase-shift control algorithm is provided for a three-inverters-in-one system to minimize the voltage/current ripples of the dc bus. As a result, the required capacity for a capacitor on the dc bus is reduced. The inverter's volume/weight/cost can be reduced accordingly. The electric motor output torque ripple is also reduced. This invention could increase the power density and specific power of a power electronic converter system.

BRIEF DESCRIPTION OF THE DRAWINGS

The features, aspects, and advantages of the present disclosure will become apparent from the following description, and the accompanying exemplary embodiments shown in the drawings, which are briefly described below.

DETAILED DESCRIPTION

According to one disclosed embodiment, a three-inverters-in-one system comprises a DC bus capacitor and three parallel inverters each with an electric motor driven by the corresponding motor. The capacitor is used, in part, to smooth and stabilize the voltage and current of the DC bus. Each inverter includes six power switches, and each of the power switches is controlled using separate control signals. The control signals are configured to minimize torque ripple of the motors by reducing the total ripple current of the DC bus by introducing phase shift between the switches of the three inverters. The total DC bus ripple current of the three-inverters-in-one system is reduced by cancelling each other's ripple current components via the control signals.

Figure 1:
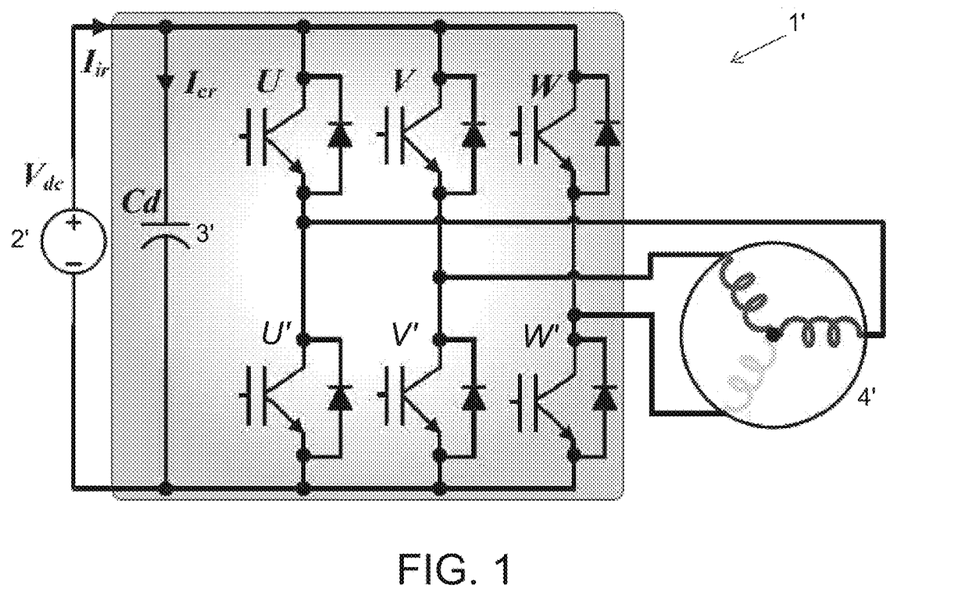
FIG. 1 is a circuit diagram depicting a single inverter and motor drive system for an electric vehicle.

FIG. 1 shows a three phase voltage source inverter (VSI) system 1' widely used in electric vehicle motors. The system 1' shown in FIG. 1 comprises a DC power source 2' which may be a main battery of an electric vehicle. A capacitor 3' is provided to smooth the voltage of the inverter system. Space vector modulation (SVM) is used to control the turn-on and turn-off of the six power switches (U, V, W, U', V', W') due to its higher output voltage amplitude and relatively low harmonic content. The inverter system powers a three phase motor 4' configured to drive the electric vehicle. The rating of the DC bus capacitor ($C_d$) is mainly determined by the voltage ripple ($V_{p\text{-}p}$) and ripple current ($I_{cr}$). The lower the voltage ripple and the higher the ripple current and therefore requiring a larger DC bus capacitance. Normally, the input ripple current ($I_{ir}$) is the AC component of the input current and is mainly related to the capacitor ripple current $I_{cr}$. Thus, a smaller ripple current $I_{cr}$ corresponds to a smaller input ripple $I_{ir}$. Not having enough capacitance (i.e., a capacitor with large enough rating) in an inverter is dangerous and may bring in high electro-magnetic interference (EMI) noise, poor output voltage/current quality and capacitor overheating, all are not desirable for automotive applications of the electric motors. On the other hand, too much capacitance increases the cost and the overall size and weight of the inverter system.

Figure 2:
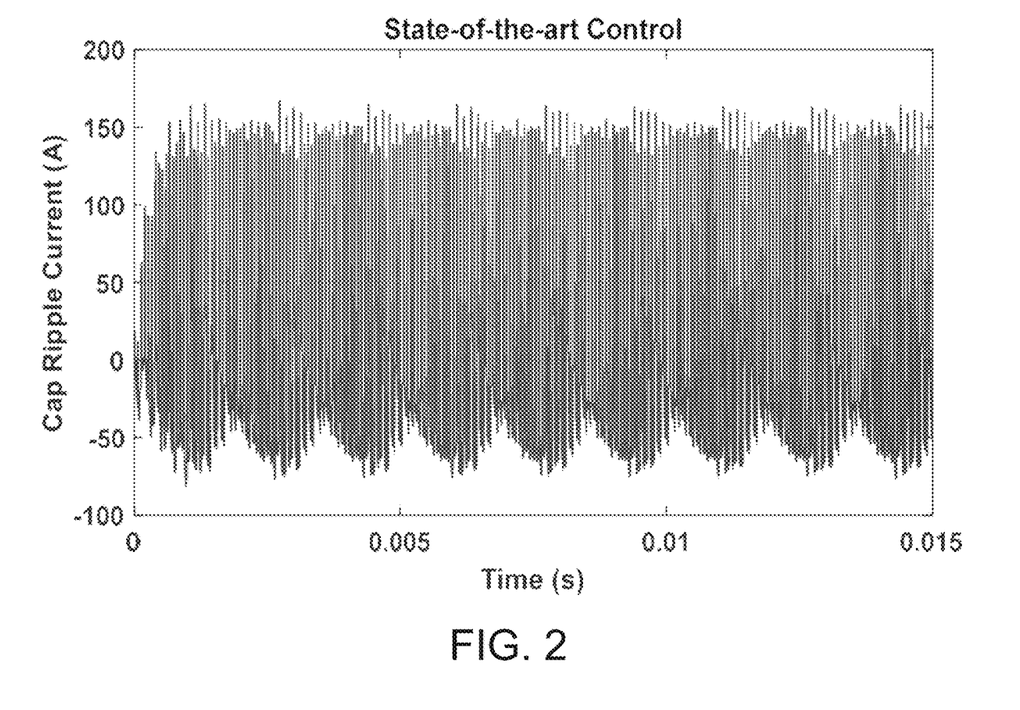
FIG. 2 is a graph of a capacitor ripple current waveform for the system shown in FIG. 1.

FIG. 2 shows a capacitor ripple current waveform with resistive inductive load (RL) where SVM is used. To reduce the required capacitance associated with the DC bus and an inverter, the concept of a segmented drive is proposed in U.S. Pat. No. 8,373,372 ("the '372 patent") in which a 2-in-1 inverter is used. The '372 patent is incorporated by reference herein. The system in the '372 patent is a very specific three phase motor wherein each phase contains two paralleled windings. The '372 patent is limited to one and two motor systems. The same fundamental voltages/currents are used for the two three phase inverters disclosed in the '372 patent. This configuration it is not commonly used for vehicles and has very limited applications in for vehicle drive systems. These motors do not provide enough torque nor do they provide a smooth power and torque curve for vehicle driving applications.

Disclosed herein are three phase motor drives with three inverters. The system disclosed herein may be distinguished from the disclosure of the '372 patent because the inverter system disclosed herein works using a different fundamental component phase angle which allows the system to be employed in electric vehicle drive applications that includes electrical motors. In high performance electrical vehicles, more than one electric motors may be used. A three-inverters-in-one system is proposed for these type of applications.

Figure 3:
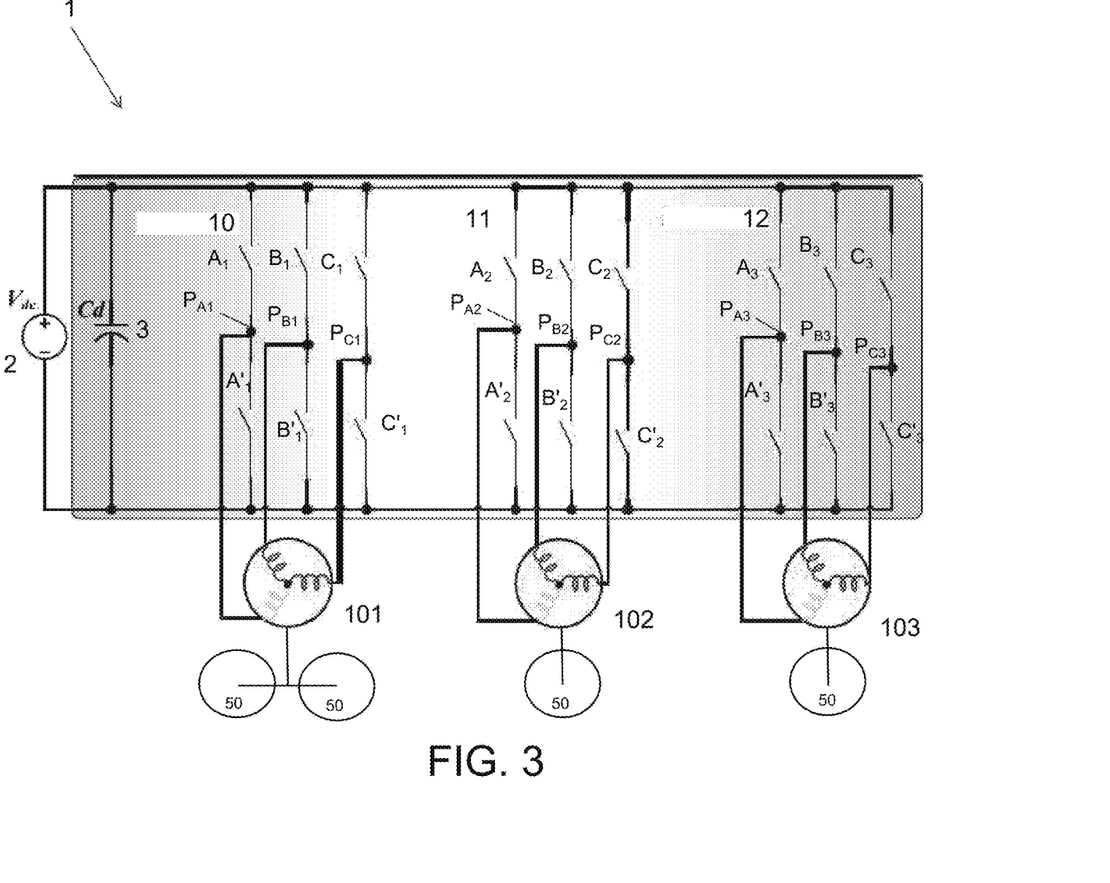
FIG. 3 is a circuit diagram showing an exemplary embodiment of a three-inverter-in-one system.

FIG. 3 shows a diagram of a three-inverters-in-one system 1, inverters 10, 11, and 12 are integrated together to drive three separate motors 101, 102, and 103 corresponding to each inverter. Each of the motors can be any known AC motors such as an AC induction motor. The motors 101, 102, 103 may also be configured to rotate the wheels 50 on a vehicle. Any of the motors 101, 102, 103 may also drive a pair of front wheels 50 or a pair of rear wheels 50. Each of the motors may be configured to drive a single wheel, or a plurality of wheels. Ideal switches ($A_{1\text{-}3}$, $B_{1\text{-}3}$, $C_{1\text{-}3}$, $A'_{1\text{-}3}$, $B'_{1\text{-}3}$, $C'_{1\text{-}3}$) are shown in FIG. 3. In various practical embodiments, different semiconductor-based switches may be used such as power MOSFETS (e.g. n-channel enhancement MOSFET) or transistors (e.g. NPN/PNP transistors) or other known power semiconductor device known. Each bridge (i.e. each pair of power switches $A_1/A'_1$, $B_1/B'_1$, $C_1/C'_1$) of the inverters is connected to different phase of the motor. A DC power source 2 provides power to the system 1. The power source may include a main battery of a vehicle. The three inverters 10, 11, and 12 are connected to only a single capacitor 3 that is disposed in the system circuit in order to smooth the voltage delivery to the inverters. The power is evenly distributed among the three motors in most operating modes. Three inverters are integrated together to share the DC bus capacitor, cooling system and mechanical housing to reduce the inverter size/weight/cost. More importantly, optimal phase shift control algorithms are proposed to shrink the capacitor size by minimizing the capacitor ripple current.

Figure 4:
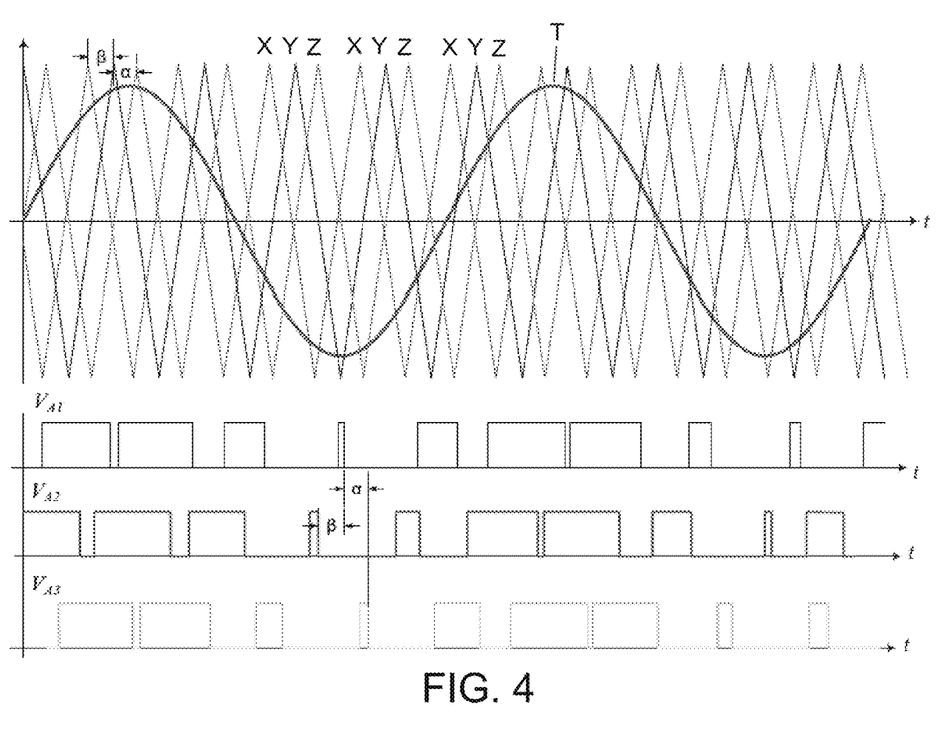
FIG. 4 is a circuit diagram showing a control methodology for a switch of each inverter in the three-inverter-in-one system shown in FIG. 3.

To control the inverter system, three sets of 6 control signals are needed, one for each switch for a total of 18 control signals. In FIG. 4, the three phase control signals are shown as the control signals of switches $A_{1-3}$ for the three inverters 10, 11, and 12. Three tri-angular waveforms X, Y, and Z are used as the carrier waveforms for inverter 10, 11 and 12, respectively. A sinusoidal wave T is used as trigger for the control signal of the switches ($A_{1-3}$, $B_{1-3}$, $C_{1-3}$, $A'_{1-3}$, $B'_{1-3}$, $C'_{1-3}$). Angle α is defined as the phase shift angle between inverter 10 and inverter 11. Similarly, angle β is defined as the phase shift angle between inverter 10 and inverter 12. Fundamental voltage $V_{A1}$, $V_{A2}$, and $V_{A3}$ may be the same. Multilevel voltages for $V_{A1}$, $V_{A2}$, and $V_{A3}$ may also be utilized. Voltages $V_{A1}$, $V_{A2}$, and $V_{A3}$ represent the voltages of the inverters at node $P_{A1}$, $P_{A2}$, $P_{A3}$ of inverters 10, 11 and 12, respectively. The trigger wave T dictates the length of the pulse width of voltages $V_{A1}$, $V_{A2}$, and $V_{A3}$. As long as the trigger wave T is greater than the carrier wave (X, Y, or Z), the switch will turn on and allow voltage at $P_{A1}$, $P_{A2}$, or $P_{A3}$ for the corresponding carrier wave (X, Y, or Z) of each inverter. The same phase difference may exist between $V_{A1}$ and $V_{A2}$, and $V_{A1}$ and $V_{A3}$, respectively. A single micro-controller (not shown) having a phase shift register is configured to control the phase shift. The microcontroller may control the magnitude of the phase shift (e.g. ratio of α to β). All three inverters/motors will be operatively connected to only one microcontroller.

Figure 5A:
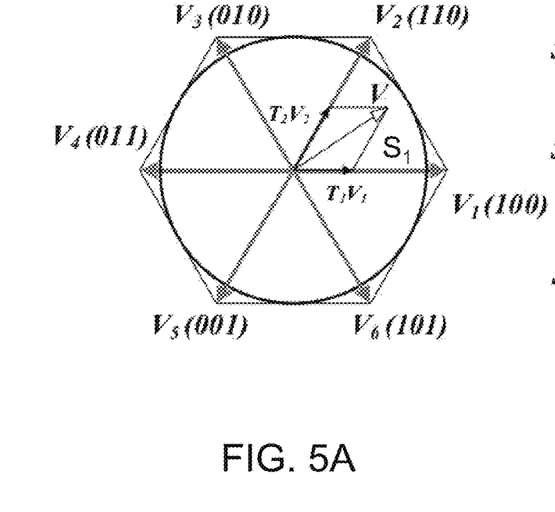
FIG. 5A is a space vector modulation vector chart.
Figure 5B:
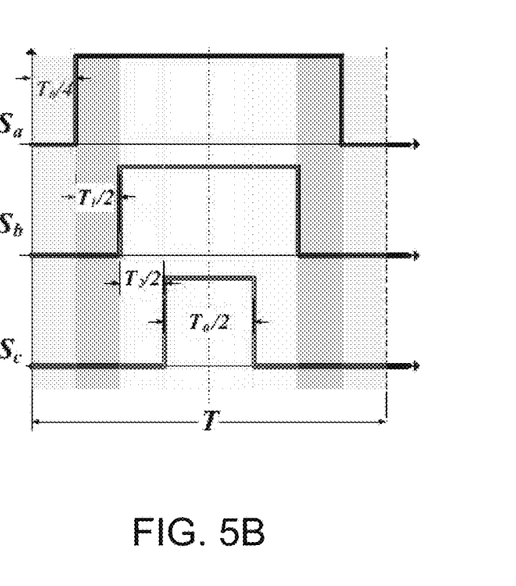
FIG. 5B is a space vector modulation sequence graph.

FIGS. 5A and 5B shows a diagram for an SVM calculation of an exemplary embodiment of the invention. FIG. 5A shows a vector diagram showing all the vector sum of all three phases of an inverter and their binary values. FIG. 5B shows the switching sequence of the first sector Si of the vector diagram for one period T. $S_a$ corresponds to any switch $A_{1-3}$, Sb corresponds to any switch $B_{1-3}$, $S_c$ corresponds to any switch $C_{1-3}$ of the same inverter. A value above the baseline value shown for $S_a$, $S_b$, and $S_c$ corresponds to an "on" position for the corresponding switch.

Figure 6A:
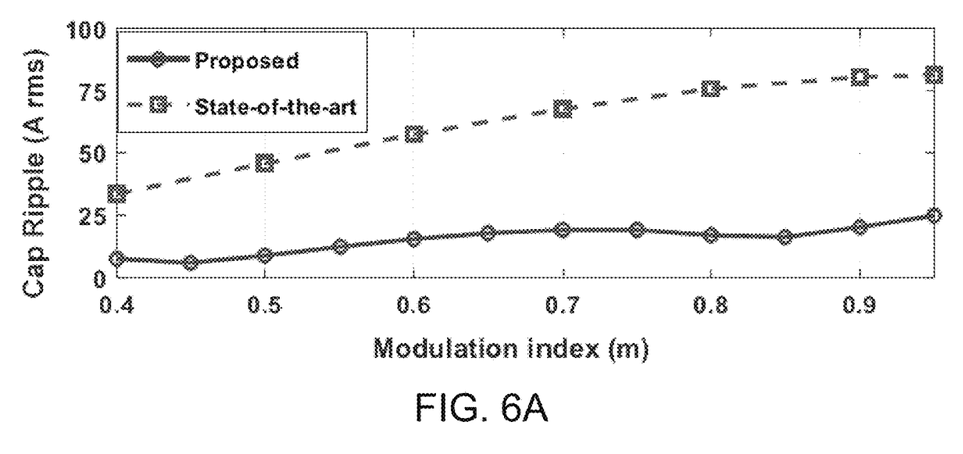
FIG. 6A shows the DC bus ripple of an exemplary three-inverter-in-one system.
Figure 6B:
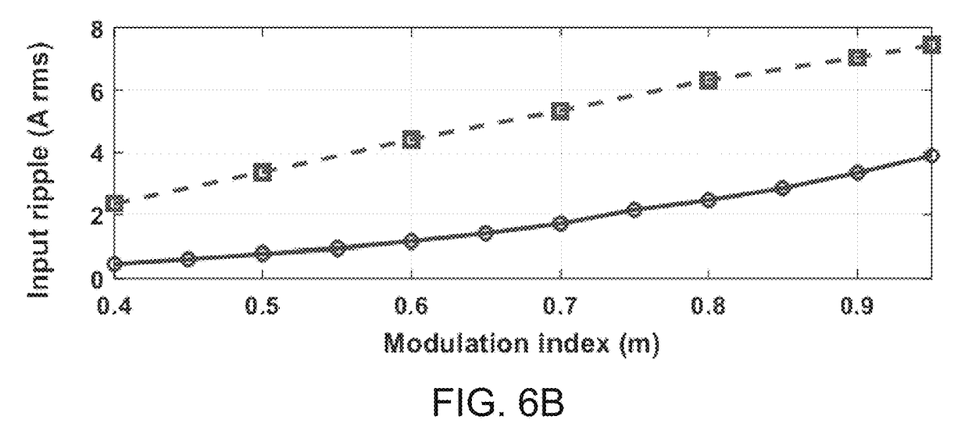
FIG. 6B shows the ripple on the DC bus inverter input side of an exemplary three-inverter-in-one system.

FIGS. 6A and 6B shows a comparison of the waveforms of an embodiment of the disclosed three-inverters-in-one system and state-of-the-art systems over different modulation indices. The modulation index is a scaling factor for the voltage of the inverters. The comparison demonstrates the improvement of the proposed control over the state-of-the-art systems. Red circles indicates the proposed optimal control with the, and blue squares indicates state-of-the-art.

FIG. 6A depicts a comparison of the capacitor ripple current rms value at optimal phase shift angle for a conventional system and an embodiment of the disclosed inverter system with the improved control. The optimal phase shift angle of the disclosed three-inverters-in-one system reduces the total capacitor ripple current by introducing a phase shift between the inverters. The total DC bus capacitor ripple current of an exemplary embodiment of the three-inverters-in-one system is reduced by cancelling each of the inverters ripple current components. An inverter switching frequency of 7.5 kHz is used for both the three-inverters-in-one system. As shown in FIG. 6A the ripple current was reduced from 80 A rms in the conventional system to about 35 A rms in the improved three-inverters-in-one system disclosed herein. The ripple current may be further reduced in the disclosed system, to about 25 A rms using fully optimized control providing a 67 percent reduction in ripple current.

FIG. 6B shows the comparison on the input ripple current, which was reduced from 7.5 A in the conventional system to about 4 A in the disclosed control system.

Figure 7:
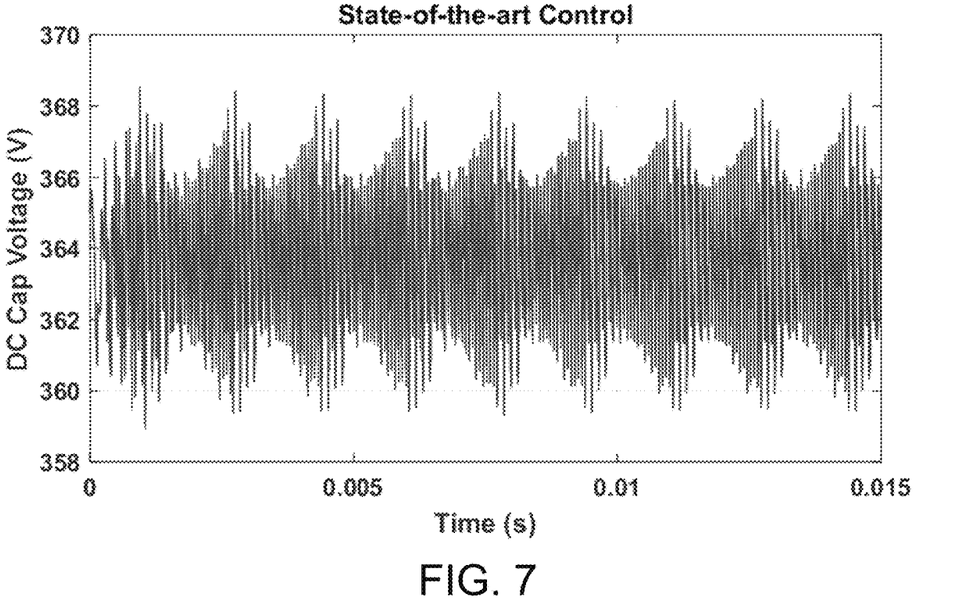
FIG. 7 is a graph of the DC bus voltage over time for a system such as shown in FIG. 1.
Figure 8:
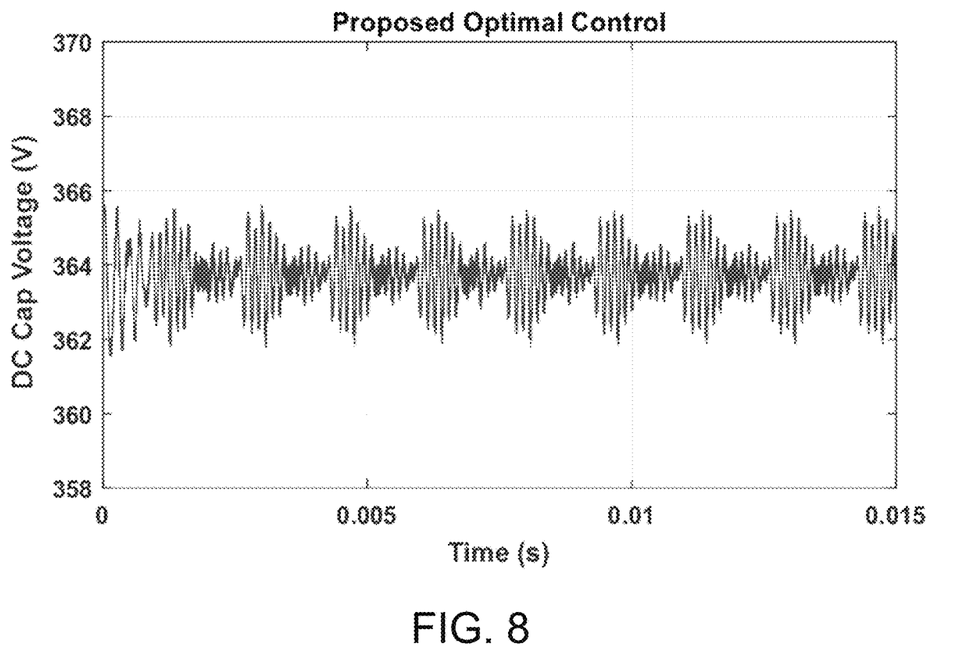
FIG. 8 is a graph of the DC bus voltage over time of an exemplary three-inverter-in-one system.

FIGS. 7 and 8 discloses a further comparison of the dc bus voltage ripple for a system employing conventional control to the control system disclosed herein at the same maximum output current. In FIG. 7, the voltage ripple for the convention system is about 9.0V peak to peak, while the voltage ripple optimal control system disclosed herein is 3.5V peak to peak only, providing for a reduction of more than 50 percent. Thus, these figures clearly show the effectiveness of the proposed optimal control system utilizing three sets of six control signals. The comparisons discussed above indicate significant reduction on the capacitor ripple current and ripple voltage, which will in turn reduce the required rating for the DC bus capacitor for the disclosed inverter system.

Figure 9:
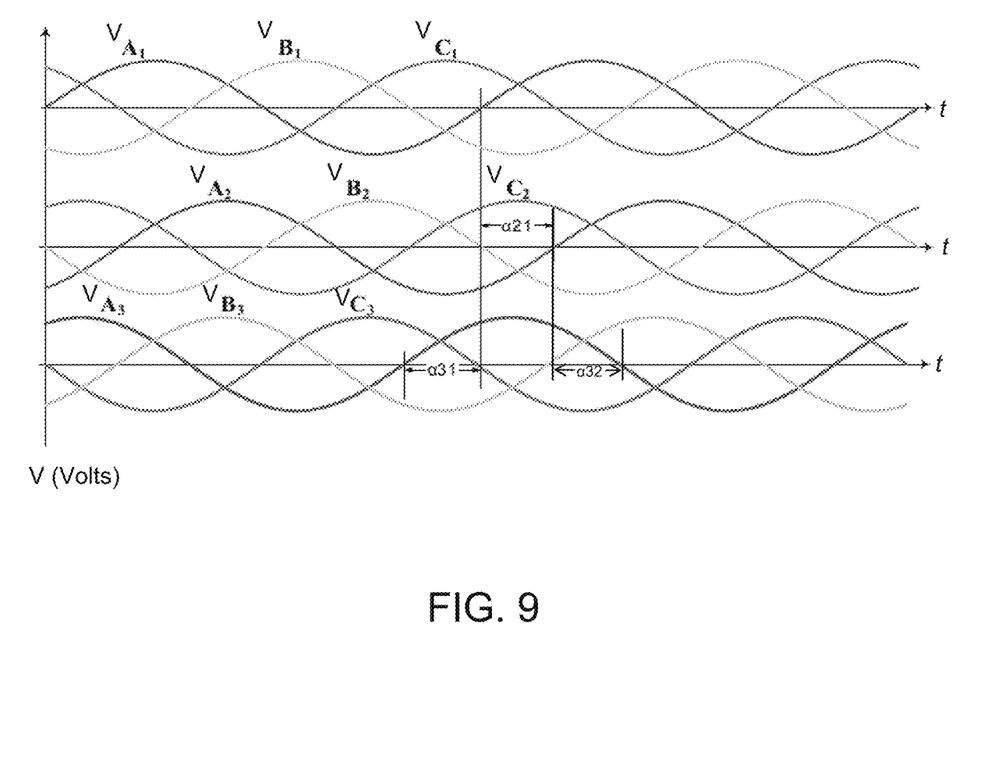
FIG. 9 shows the voltages of each bridge of the exemplary three-inverter-in-one system shown in FIG. 3.

In an exemplary embodiment of the three-inverters-in-one system, the three inverters operate at the same or similar frequency. However, the phase angle of the three inverters may be different. In FIG. 9, the top plot shows the three phase voltages $V_{A1}$, $V_{B1}$ and $V_{C1}$ of nodes $P_{A1}$, $P_{B1}$, and $P_{B1}$, respectively in inverter 10 over time t (see FIG. 3). The middle plot shows the three phase voltages $V_{A1}$, $V_{B1}$, and $V_{C1}$, of nodes $P_{A1}$, $P_{B1}$ and $P_{B1}$, respectively in inverter 11 over time t. The bottom plot shows the three phase voltages $V_{A2}$, $V_{B2}$, and $V_{C2}$ off nodes $P_{A3}$, $P_{B3}$, and $P_{B3}$, respectively of inverter 12 over time t. The phase angle difference between $P_{A1}$ and $P_{A2}$ is $α_{21}$, and the phase angle difference between $P_{A1}$ and $P_{A3}$ is $α_{31}$. The phase angle difference between $P_{A2}$ and $P_{A3}$ is $α_{23}$.

Figure 10:
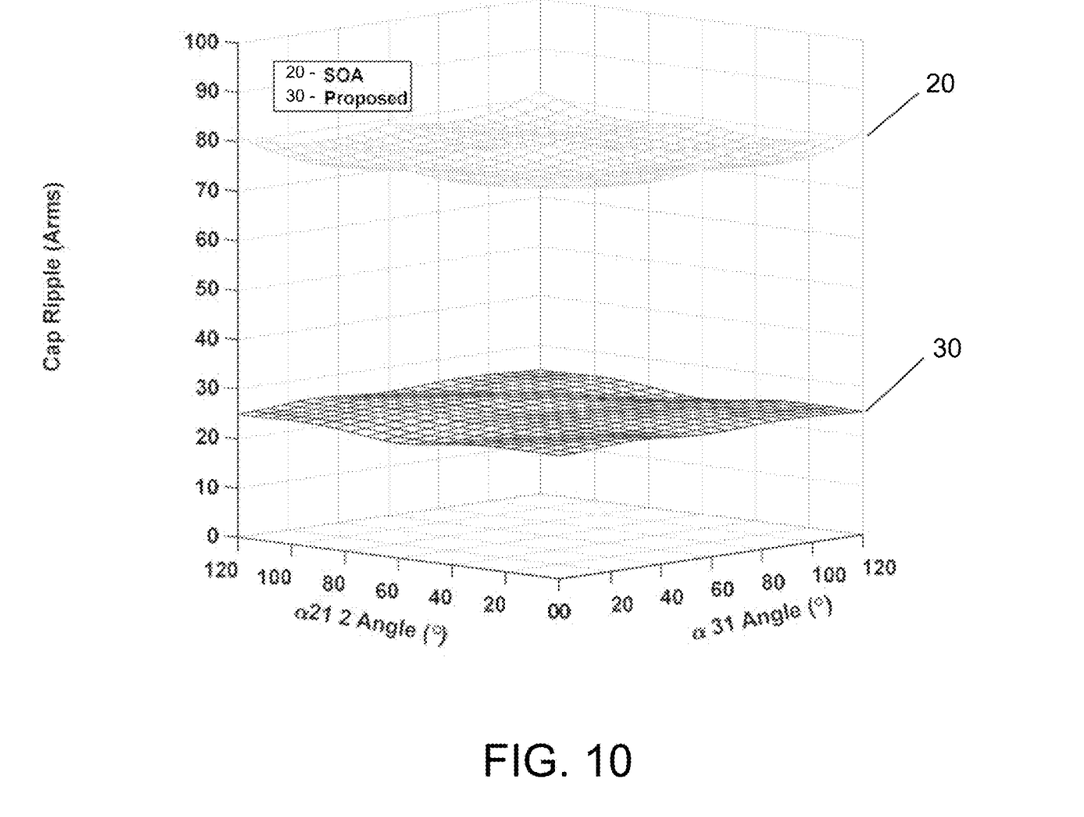
FIG. 10 shows the DC bus ripple current of the exemplary three-inverter-in-one system compared to a system such as shown in FIG. 1.

FIG. 10 shows both the DC bus ripple current of the state-of-the-art (SOA) or conventional control system 20 and for the proposed optimal control system 30 disclosed herein. As explained above the control system 30 is used, in an exemplary embodiment, in the three-inverters-in-one system at different phase angles (both from 0 to 120 degrees). The optimal control system disclosed herein can effectively reduce the capacitor ripple current at all different conditions. In the meantime, there are minor variations on the capacitor ripple current at different $α_{21}$ and $α_{32}$.

As a summary, a system and method to reduce the dc capacitor ripple current is proposed for a three-inverters-in-one system in this invention. This disclosed control system reduces the total capacitor ripple current of the three-inverters-in-one system by introducing phase shift between the inverters. The total DC bus capacitor ripple current of the three-inverters-in-one system is reduced by effectively cancelling the ripple current components of each of the inverters. The output torque ripple of the motors on the vehicle is reduced as well, by an amount effectively the same as the phase difference in the three torque ripple components. The output torque is effected by the current ripple components of the three individual inverters but, due to the reduction in the current ripple, the effect on the output torque is reduced.

Thus, an exemplary embodiment of the three-inverters-in-one system disclosed herein. The three-inverters-in-one system includes a phase shifted control system and scheme to reduce DC current and voltage ripple in the system. The proposed control system may reduce the voltage/current ripple on the DC bus by 70% at m=0.95 when compared with a state-of-the-art or conventional system. The proposed control system of the three-in-one inverter system may function at different phase angle differences among the fundamental voltages of the three inverters and similar ripple reduction may be achieved at the various fundamental voltages.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the inverter system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An inverter assembly receiving power from a DC source, the inverter assembly comprising:
   a DC bus capacitor;
   at least two inverters, wherein each inverter of the at least two inverters comprises six power switches configured to convert power from the DC source to power a corresponding three phase AC motor;
   a first inverter of the at least two inverters receiving a first control signal;
   a second inverter of the at least two inverters receiving a second control signal; and
   wherein the first control signal operates at a first phase angle relative to a second control signal, such that a ripple current of the DC bus capacitor is minimized; and
   a third inverter receiving a third control signal at a second phase angle relative to the first control signal for the first inverter.

2. The inverter assembly of claim 1, wherein the first control signal, second control signal, and third control signal operates at the same frequency.

3. The inverter assembly of claim 1, wherein the first phase angle is different to the second phase angle.

4. The inverter assembly of claim 1, wherein the first phase angle is the same as the second phase angle.

5. The inverter assembly of claim 1, wherein each of the six power switches comprise NPN-transistors.

6. An vehicle comprising:
   a plurality of wheels;
   a DC power source;
   a DC bus capacitor;
   a plurality of AC motors;
   at least two integrated inverters in a parallel configuration connected to the DC power source and the DC bus capacitor, wherein each inverter of the at least two inverters comprises six power switches configured to convert power from the DC source to power a corresponding AC motor;
   wherein each corresponding AC motor drives at least one wheel of the plurality of wheels;
   a first inverter of the at least two inverters receiving a first control signal;
   a second inverter of the at least two inverters receiving a second control signal; and
   wherein the first control signal operates at a first phase angle relative to a second control signal, such that a ripple current of the DC bus capacitor is minimized; and
   a third inverter receiving having a third control signal at a second phase angle relative to the first control signal for the first inverter.

7. The vehicle of claim 6, wherein the first control signal, second control signal, and third control signal operates at the same frequency.

8. The vehicle of claim 6, wherein the first phase angle is different to the second phase angle.

9. The vehicle of claim 6, wherein the first phase angle is the same as the second phase angle.

10. The inverter assembly of claim 6, wherein each of the six power switches comprise NPN-transistors.

11. An inverter assembly receiving power from a DC power source, the inverter assembly comprising:
    a DC bus capacitor;
    three integrated inverters, wherein each inverter of the three inverters comprises six power switches configured to convert power from the DC power source to power a corresponding three phase AC motor;

wherein each inverter of the three inverters are in a parallel connection to each other, the DC power source and the DC bus capacitor; and a first inverter of the three inverters receiving a first control signal;

a second inverter of the three inverters receiving a second control signal;

a third inverter of the three inverters receiving a third control signal; and wherein the first control signal is a first phase angle relative to a second control signal and the first control signal is a second phase angle relative to a third control signal, such that a ripple current of the DC bus capacitor is minimized by having the current ripple of each inverter of three inverters interfere with each other.

12. The inverter assembly of claim 11, the first control signal, second control signal, and third control signal operates at the same frequency.

13. The inverter assembly of claim 11, wherein the first phase angle is different to the second phase angle.

14. The inverter assembly of claim 11, wherein the first phase angle is the same as the second phase angle.

15. The inverter assembly of claim 11, wherein the AC motor is configured to drive a wheel of a vehicle.

16. The inverter assembly of claim 11, wherein each of the power switch of the at least two inverters are NPN-transistors.

* * * * *